United States Patent
Yoshida et al.

(10) Patent No.: US 8,092,917 B2
(45) Date of Patent: Jan. 10, 2012

(54) GAS-BARRIER LAMINATE

(75) Inventors: Shigenobu Yoshida, Tokyo (JP); Tooru Hachisuka, Tokyo (JP); Chiharu Okawara, Tokyo (JP)

(73) Assignee: Mitsubishi Plastics, Inc., Tokyo (JP)

( * ) Notice: Subject to any disclaimer, the term of this patent is extended or adjusted under 35 U.S.C. 154(b) by 42 days.

(21) Appl. No.: 10/563,299

(22) PCT Filed: Jun. 28, 2004

(86) PCT No.: PCT/JP2004/009111
§ 371 (c)(1), (2), (4) Date: Jun. 1, 2006

(87) PCT Pub. No.: WO2005/009731
PCT Pub. Date: Feb. 3, 2005

(65) Prior Publication Data
US 2007/0059541 A1    Mar. 15, 2007

(30) Foreign Application Priority Data
Jul. 29, 2003   (JP) ................................. 2003-203227

(51) Int. Cl.
B32B 27/30  (2006.01)
B32B 27/32  (2006.01)
B32B 27/34  (2006.01)
B32B 27/36  (2006.01)
B32B 27/40  (2006.01)

(52) U.S. Cl. .................. 428/480; 428/423.7; 428/424.8; 428/475.2; 428/477.7; 428/483; 428/520; 428/523; 428/688; 428/702; 428/195.1; 428/35.2; 428/35.3; 428/35.8; 428/36.6

(58) Field of Classification Search .................. 428/480, 428/688, 689, 35.2, 35.3, 35.8, 36.6, 195.1, 428/423.7, 424.8, 475.2, 477.7, 483, 520, 428/523, 702
See application file for complete search history.

(56) References Cited

U.S. PATENT DOCUMENTS

| | | | |
|---|---|---|---|
| 4,436,895 A | | 3/1984 | Barbee et al. |
| 5,084,356 A | * | 1/1992 | Deak et al. ................... 428/458 |
| 5,314,561 A | * | 5/1994 | Komiya ................... 156/244.11 |
| 5,427,235 A | * | 6/1995 | Powell et al. ................. 206/245 |
| 5,491,018 A | * | 2/1996 | Maro et al. .................... 428/200 |
| 5,667,886 A | * | 9/1997 | Gough et al. .................. 428/331 |
| 5,683,534 A | * | 11/1997 | Lofgren et al. ............... 156/231 |
| 5,804,300 A | * | 9/1998 | Maro et al. .................... 428/335 |
| 5,853,862 A | * | 12/1998 | Murai et al. ................... 428/215 |
| 5,856,017 A | * | 1/1999 | Matsuda et al. .............. 428/446 |
| 6,013,363 A | * | 1/2000 | Takahashi et al. .......... 428/315.9 |
| 2002/0009564 A1 | * | 1/2002 | Hall et al. ..................... 428/35.7 |
| 2002/0061959 A1 | * | 5/2002 | Kajimaru et al. ............. 524/601 |
| 2003/0113561 A1 | * | 6/2003 | Katsuta et al. ................ 428/480 |
| 2005/0208282 A1 | * | 9/2005 | Wood et al. ................... 428/216 |
| 2006/0141244 A1 | * | 6/2006 | Hatada .......................... 428/336 |

FOREIGN PATENT DOCUMENTS

| | | | |
|---|---|---|---|
| EP | 789051 A2 | * | 8/1997 |
| JP | 5-269914 | | 10/1993 |
| JP | 05 269914 A | | 10/1993 |
| JP | 7-137192 | | 5/1995 |
| JP | 07 137192 A | | 5/1995 |
| JP | 10-71663 | | 3/1998 |
| JP | 2002036422 | * | 2/2002 |
| JP | 2005047964 A | * | 2/2005 |

OTHER PUBLICATIONS

Machine translation of Noboru et al. (JP 07-137192).*
"Terms of Environment: Glossary, Abbreviations and Acronyms". US EPA. Accessed Nov. 21, 2008.*
Murphy, John (2001). Additives for Plastics Handbook (2nd Edition). (pp. 434). Elsevier.*
Machine translation of JP 2005047964 (2011).*
International Search Report for PCT/JP2004/009111 dated Oct. 5, 2004 (English and Japanese).
Database WPI Week 199530, Thomson Scientific, London, GB, AN 1995-227984; XP002574909.
Database WPI Week 199346, Thomson Scientific, London, GB, AN 1993-364759; XP002574910.
Supplementary Search Report in EP 04746580.2 dated Apr. 6, 2010.

* cited by examiner

*Primary Examiner* — Jennifer McNeil
*Assistant Examiner* — John Freeman
(74) *Attorney, Agent, or Firm* — Nixon & Vanderhye PC

(57) ABSTRACT

A gas-barrier laminate comprises a plastic substrate (A), an inorganic thin film (B) formed on at least one surface of the plastic substrate (A), and a polyester-based resin layer (C) formed by applying a coating material containing a polyester-based resin on a surface of the inorganic thin film (B), wherein the polyester-based resin has a glass transition temperature of 50 to 70° C., a molecular weight of 1500 to 15000 and a hydroxyl value of 10 to 60 mg KOH/g, and the gas-barrier laminate has an oxygen permeability of not more than 5 cc/m$^2$/day/atm and a water vapor permeability of not more than 5 g/m$^2$/day. The gas-barrier laminate of the present invention is excellent in printability (in particular, gradation printability), is free from deterioration in gas-barrier property, namely is excellent in gas-barrier property, even after providing a printed layer thereon, and further exhibits an excellent adhesion between the plastic substrate (A) and the inorganic thin film (B) even after being subjected to retort treatments.

9 Claims, No Drawings

GAS-BARRIER LAMINATE

This application is the US national phase of international application PCT/JP2004/009111 filed 28 Jun. 2004, which designated the U.S. and claims priority to JP 2003-203227 filed 29 Jul. 2003, the entire contents of each of which are hereby incorporated by reference.

TECHNICAL FIELD

The present invention relates to a gas-barrier laminate, and more particularly to a gas-barrier laminate which is excellent in gas-barrier property, adhesion to a gas-barrier layer and printability.

BACKGROUND ARTS

Hitherto, gas-barrier laminates comprising a plastic substrate and an inorganic thin film comprising aluminum oxide, magnesium oxide, silicon oxide, etc., and formed on the surface of the plastic substrate by a vapor-deposition method, a sputtering method, a CVD method or an ion-plating method, have been extensively used in various applications such as packaging of products which should be shielded against various gases such as water vapor and oxygen, and packaging of food, industrial products and drugs for preventing deterioration in quality thereof. These gas-barrier laminates have been recently used not only in these packaging applications, but also as a component of transparent conductive sheets which are used in liquid crystal displays, solar cells, electromagnetic shielding members, touch panels, EL substrates or color filters. Moreover, the above gas-barrier laminates have also widely used as printed packaging materials because such an inorganic thin film generally has a good wettability and, therefore, a good printability.

In order to enhance a gas-barrier property of the inorganic thin film of the above gas-barrier laminates, there have been proposed methods of subjecting the inorganic thin film to various surface treatments. For example, there is known the method of absorbing water in a vapor-deposited silicon oxide film used as the inorganic thin film and then heat-treating the film to enhance a gas-barrier property thereof (e.g., refer to Japanese Patent Application Laid-Open (KOKAI) No. 2-299826).

However, the gas-barrier laminate obtained by the above method has such a problem that when the inorganic thin film is rubbed in subsequent laminating and printing processes, or when the resultant laminate is folded or bent in a subsequent bag-making process, the inorganic thin film tends to be damaged and deteriorated in gas-barrier property. In particular, in the case where white ink containing a titanium oxide pigment is used for printing, the inorganic thin film tends to be more severely damaged and, therefore, considerably deteriorated in gas-barrier property.

In order to prevent the inorganic thin film from being damaged upon the above various processes, there have been proposed the method of forming a transparent primer layer comprising a resin having a glass transition point of not less than 40° C. on the surface of the inorganic thin film (e.g., refer to Japanese Patent Application Laid-Open (KOKAI) No. 5-269914), the method of forming an aqueous anchor coat layer on the surface of the inorganic thin film (e.g., refer to Japanese Patent Application Laid-Open (KOKAI) No. 5-309777), the method of forming a layer comprising an aqueous resin or an aqueous emulsion containing silicon oxide on the surface of the inorganic thin film (e.g., refer to Japanese Patent Application Laid-Open (KOKAI) No. 5-9317), the method of forming a primer layer comprising a polyester resin, a polyurethane resin or a nitrocellulose resin having a glass transition temperature of 60 to 80° C. and a molecular weight of 10000 to 20000 on the surface of the inorganic thin film (e.g., refer to Japanese Patent Application Laid-Open (KOKAI) No. 7-137192), the method of forming a coating layer comprising an organic polymer and inorganic fine particles on the surface of the inorganic thin film (e.g., refer to Japanese Patent Application Laid-Open (KOKAI) No. 10-71663), and the method of forming a coating layer made of a resin such as urethane and/or vinyl chloride-vinyl acetate copolymer on the surface of the inorganic thin film (e.g., refer to Japanese Patent Application Laid-Open (KOKAI) No. 2001-270026).

However, when a printing ink is applied onto the surface of these resin coating layers to form a printed layer thereon, there tend to be caused various problems such as ink bleeding due to penetration of a solvent contained in the printing ink into the resin coating layers, and cissing of the printing ink due to poor wettability of the resin coating layers. Thus, the conventional laminates which are subjected to printing, in particular, gradation printing, tend to suffer from poor appearance. Further, since an adhesion strength between the plastic substrate and the inorganic thin film is low, the resultant laminates tend to be deteriorated in hand-cutting property.

DISCLOSURE OF THE INVENTION

Problem to be Solved by the Invention

Thus, an object of the present invention is to provide a gas-barrier laminate which is excellent in printability, in particular, gradation printability, and is free from deterioration in a gas-barrier property even when forming a printed layer thereon, and further exhibits an excellent adhesion between a plastic substrate and an inorganic thin film even when subjected to retort treatments.

Means for Solving the Problem

As a result of the present inventors' earnest study, it has been found that when a coating material containing a specific polyester-based resin is applied onto an inorganic thin film to form a polyester-based resin layer thereon, it becomes possible to enhance a gas-barrier property and an adhesion property of the inorganic thin film, prevent the inorganic thin film from being damaged by a pigment in printing ink, and form a printed layer which can impart a good appearance to the resultant laminate. The present invention has been attained on the basis of the above finding.

That is, in an aspect of the present invention, there is provided a gas-barrier laminate comprising a plastic substrate (A), an inorganic thin film (B) formed on at least one surface of the plastic substrate (A), and a polyester-based resin layer (C) formed by applying a coating material containing a polyester-based resin on a surface of the inorganic thin film (B), said polyester-based resin having a glass transition temperature of 50 to 70° C., a molecular weight of 1500 to 15000 and a hydroxyl value of 10 to 60 mg KOH/g, and said gas-barrier laminate having an oxygen permeability of not more than 5 cc/m$^2$/day/atm and a water vapor permeability of not more than 5 g/m$^2$/day.

Effect of the Invention

The gas-barrier laminate of the present invention is excellent in printability, in particular, gradation printability, and is free from deterioration in a gas-barrier property, namely is excellent in gas-barrier property, even when forming a printed layer thereon, and further exhibits an excellent adhesion property between the plastic substrate (A) and the inorganic thin film (B) even when subjected to retort treatments. Therefore, the present invention has a high industrial value.

PREFERRED EMBODIMENTS OF THE INVENTION

The present invention is described in detail below.

The plastic substrate (A) used in the present invention may be comprise any suitable plastic materials without particular limitations as long as they are usable as ordinary packaging materials. Examples of the plastic materials may include polyolefins such as homopolymers and copolymers of ethylene, propylene, butene, etc., amorphous polyolefins such as cyclic polyolefins, polyesters such as polyethylene terephthalate and polyethylene-2,6-naphthalate, polyamides such as nylon 6, nylon 66, nylon 12 and copolymerized nylons, partially hydrolyzed products of ethylene-vinyl acetate copolymer (EVOH), polyimides, polyether imides, polysulfones, polyether sulfones, polyether ether ketones, polycarbonates (PC), polyvinyl butyral, polyallylates, fluororesins, acrylate resins, biodegradable resins or the like.

Specific examples of the biodegradable resins may include starch/polycaprolactone (for example, "MASTER-BE-Z" available from Nippon Gosei Co., Ltd.), polycaprolactone (for example, "CELGRUN" produced by Daicel Kagaku Co., Ltd.), polyethylene succinate ("LUNALE SE" produced by Nippon Shokubai Co., Ltd.), polybutylene succinate (for example, "BIONOLE 1001" produced by Showa Kobunsi Co., Ltd.), polybutylene succinate/adipate (for example, "BIONOLE 3001" produced by Showa Kobunsi Co., Ltd.), polyester carbonate (for example, "UPACK" produced by Mitsubishi Gas Chemical Co., Ltd.), and aromatic polyester (adipic acid) (for example, "ECOFLEX" produced by BASF AG). The above biodegradable resins except for "MASTER-BE-Z" are chemically synthesized resins. In addition to the above-exemplified biodegradable resins, there may also be used natural product-derived biodegradable resins such as cellulose acetate (for example, "CELGREEN PCA" produced by Daicel Kagaku Co., Ltd.), and chemically modified starch ("CORN POLE" produced by Nippon Cornstarch Co., Ltd.).

Among these resins, preferred are polyesters, polyamides, polyolefins and biodegradable resins.

The plastic substrate (A) used in the present invention may be produced from the above raw materials, and may be either an unstretched substrate or a stretched substrate, or a laminated substrate with other plastic substrates. Such a plastic substrate (A) is preferably in the form of a film from the standpoint of a good productivity of thin film laminates, and may be produced by ordinary conventionally known methods. For example, the raw resin may be fed to an extruder and melted therein, extruded through a cyclic die or a T-die, and then rapidly cooled to produce an unstretched film which is substantially in an amorphous and non-oriented state. Then, the thus obtained unstretched film may be stretched in longitudinal and/or transverse directions thereof by ordinary conventionally known methods such as monoaxial stretching, tenter-type successive biaxial stretching, tenter-type-simultaneous biaxial stretching and tubular-type simultaneous biaxial stretching, thereby obtaining a stretched film which is stretched in at least one direction.

The film thickness of the plastic substrate (A) may be determined according to properties required for a substrate of the laminate of the present invention such as mechanical strength, flexibility and transparency as well as various applications thereof, and the film thickness is usually 5 to 500 μm, preferably 10 to 200 μm. In addition, the width and length of the film as the plastic substrate (A) are not particularly limited, and may be appropriately determined according to the applications thereof.

The inorganic thin film (B) is formed on the plastic substrate (A). In order to enhance adhesion between the plastic substrate (A) and the inorganic thin film (B) formed on the plastic substrate (A), an anchor coat layer is preferably provided on the plastic substrate (A). The anchor coat layer may be usually formed by applying a coating solution containing an anchor coat agent on the plastic substrate (A) by an in-line coating method or an off-line coating method. Examples of the anchor coat agent may include solvent-soluble or water-soluble polyester resins, isocyanate resins, urethane resins, acrylic resins, vinyl alcohol resins, ethylene-vinyl alcohol resins, vinyl-modified resins, epoxy resins, oxazoline group-containing resins, modified styrene resins, modified silicone resins, alkyl titanates or the like. These anchor coat agents may be used alone or in combination of any two or more thereof. Among these resins, preferred are polyester resins, urethane resins, acrylic resins and oxazoline group-containing resins.

The thickness of the anchor coat layer is usually 0.005 to 5 μm, preferably 0.01 to 1 μm. When the thickness of the anchor coat layer is more than 5 μm, the anchor coat layer tends to be deteriorated in slip property and tends to be peeled off from the substrate film or sheet owing to an internal stress generated therein. When the thickness of the anchor coat layer is less than 0.005 μm, the anchor coat layer may fail to have a uniform thickness. Also, in order to improve a coating property and an adhesion property of the coating solution containing the anchor coat agent onto the substrate film, the surface of the substrate film may be subjected to chemical treatments or discharge treatments before applying the coating solution thereonto.

Examples of inorganic materials constituting the inorganic thin film (B) formed on the plastic substrate (A) may include silicon, aluminum, magnesium, zinc, tin, nickel, titanium, carbon, and oxides, carbides and nitrides of these elements as well as mixtures of these compounds. Among these inorganic materials, preferred are silicon oxide, aluminum oxide and diamond-like carbon, and more preferred is silicon oxide because of remarkable effects upon the hydrothermal treatment of the present invention, a good transparency, and stable retention of a high gas-barrier property.

The method of forming the inorganic thin film (B) is not particularly limited, and the inorganic thin film (B) may be produced by using a vapor-deposition method, a coating method or the like. Among these methods, the vapor-deposition method is preferred because of formation of a uniform thin film having a high gas-barrier property. Examples of the vapor-deposition method may include physical vapor-deposition methods such as vacuum deposition method, ion-plating method and sputtering method, and chemical vapor-deposition methods such as CVD. The thickness of the inorganic thin film (B) is usually 0.1 to 500 nm, preferably 0.5 to 40 nm. When the thickness of the inorganic thin film (B) is less than 0.1 nm, the resultant laminate may fail to have a sufficient gas-barrier property. On the other hand, when thickness of the inorganic thin film (B) is more than 500 nm, the inorganic thin film (B) tends to suffer from cracks or peeling-off as well as poor transparency.

The polyester-based resin layer (C) may be formed on the inorganic thin film (B) by applying a polyester-based resin having a glass transition temperature of 50 to 70° C., a molecular weight of 1500 to 15000 and a hydroxyl value of 10 to 60 mg KOH/g onto the surface of the inorganic thin film (B). When using the polyester-based resin having the above properties, it is possible to improve a gas-barrier property and a printability of the resultant laminate. Examples of a polycarboxylic acid component constituting the polyester-based resin may include terephthalic acid, isophthalic acid, adipic acid, sebacic acid, azelaic acid, orthophthalic acid, diphenyldicarboxylic acid and dimethylphthalic acid. Examples of a polyhydric alcohol component constituting the polyester-based resin may include ethylene glycol, 1,2-propylene glycol, 1,3-propylene glycol, 1,4-butanediol, diethylene glycol, neopentyl glycol, dipropylene glycol, 1,6-hexanediol and bisphenol A. When reacting the polycarboxylic acid with the polyhydric alcohol under such a condition that OH groups are present in an excess amount relative to COOH groups, it is possible to obtain the polyester-based resin having the above properties. For example, phthalic acid, terephthalic acid, ethylene glycol and neopentyl glycol are mixed and reacted with each other to produce a polyester having a weight-average molecular weight of 8000, a hydroxyl value of 16 and a glass transition temperature of 62° C.

When the glass transition temperature of the polyester-based resin is less than 50° C., the polyester-based resin tends to suffer from shrinkage owing to poor thermal stability thereof, resulting in deteriorated gas-barrier property, occurrence of blocking upon storage, and rough coating surface of the resultant laminate. When the glass transition temperature of the polyester-based resin is more than 70° C., the adhesion between the polyester-based resin layer (C) and the inorganic thin film (B) tends to be deteriorated. The glass transition temperature of the polyester-based resin is preferably 55 to 65° C.

The lower the molecular weight of the polyester-based resin, the more the gas-barrier property can be improved. However, when the molecular weight of the polyester-based resin is less than 1500, the resultant coating layer tends to be too brittle and, therefore, may fail to show properties required as a protective layer. On the other hand, when the molecular weight of the polyester-based resin is more than 15000, the polyester-based resin may fail to have a high crosslinking density due to less crosslinking points even when crosslinked with polyisocyanates, etc., and, therefore, tends to be dissolved in printing ink or swelled up therewith, resulting in poor printing appearance. The molecular weight of the polyester-based resin is preferably 1500 to 10000, more preferably 5000 to 8000.

When the hydroxyl value of the polyester-based resin is less than 10, the polyester-based resin may fail to have a high crosslinking density due to less crosslinking points even when crosslinked with polyisocyanates, etc., and, therefore, tends to be dissolved in printing ink or swelled up therewith, and the resultant laminate tends to be deteriorated in gas-barrier property. On the other hand, when the hydroxyl value of the polyester-based resin is more than 60, the polyester-based resin tends to have a too high crosslinking density due to too large number of crosslinking points, so that the obtained polyester-based resin layer (C) tends to form a hard and less-flexible coating film, and the polyester-based resin tends to suffer from a large stress upon curing. As a result, the gas-barrier property of the resultant laminate as well as the adhesion between the polyester-based resin layer (C) and the inorganic thin film (B) tend to be deteriorated. The hydroxyl value of the polyester-based resin is preferably 15 to 50, more preferably 15 to 30.

The coating material containing the polyester-based resin may be prepared by dissolving the above polyester-based resin in an organic solvent. Further, a polyisocyanate as a curing agent is preferably added to the coating material upon use. The concentration of the polyester-based resin in the coating material is usually 20 to 50% by weight. The organic solvent used for the preparation of the coating material is not particularly limited as long as the polyester-based resin can be dissolved therein. Examples of the organic solvent may include esters such as ethyl acetate and butyl acetate, ketones such as methyl ethyl ketone and methyl isobutyl ketone, and aromatic hydrocarbons such as toluene and xylene. These organic solvents may be used alone or in the form of a mixture of any two or more thereof. Among these organic solvents, preferred is a mixed solvent of toluene and methyl ethyl ketone.

For the purpose of enhancing a coating property of printing ink on the polyester-based resin layer as well as a gas-barrier property of the resultant laminate, the coating material containing the polyester-based resin preferably further contains at least one compound selected from the group consisting of aliphatic hydrocarbon-based compounds such as liquid paraffins, microcrystalline waxes, natural paraffins, synthetic paraffins and polyethylene; fatty acid-based compounds such as stearic acid, lauric acid, hydroxystearic acid and hardened castor oil; fatty amide-based compounds such as stearamide, oleamide, erucamide, lauramide, palmitamide, behenamide, ricinolamide, oxystearamide, methylenebisstearamide, ethylenebisstearamide, ethylenebisoleamide, ethylenebisbehenamide and ethylenebislauramide; metals salts of fatty acids having 12 to 30 carbon atoms such as lead stearate, calcium stearate and calcium hydroxystearate; fatty ester-based compounds such as polyhydric alcohol fatty (partial) ester-based compounds, e.g., glycerol fatty esters, hydroxystearic acid triglyceride and sorbitan fatty esters, butyl stearate, and long-chain ester waxes, e.g., montan wax; and composite compounds thereof.

Among the above compounds added to the coating material, preferred are fatty acid-based compounds, fatty amide-based compounds and fatty ester-based compounds, and more preferred are fatty amide-based compounds. The amount of the compound added to the above coating material is usually 0.05 to 20 parts by weight, preferably 0.1 to 10 parts by weight based on 100 parts by weight of a solid content of the polyester-based resin. When the amount of the compound added to the coating material is less than 0.05 part by weight, a sufficient effect of improving the gas-barrier property may not be attained, and the printing appearance tends to be deteriorated. When the amount of the compound added to the coating material is more than 20 parts by weight, the adhesion between the polyester-based resin layer (C) and the inorganic thin film (B) tends to be deteriorated.

The polyisocyanates added to the coating material containing the polyester-based resin are not particularly limited, and there may be used any suitable polyisocyanates which are conventionally known as crosslinking agents. Examples of the preferred polyisocyanates may include polyisocyanates containing not less than 3 active isocyanate groups in a molecule thereof and having an isocyanate group content of not less than 12% by weight (calculated as the solid content). Specific examples of the polyisocyanates may include aliphatic polyisocyanates such as hexamethylene diisocyanate, xylene diisocyanate and dicyclohexylmethane diisocyanate; and aromatic polyisocyanates such as tolylene diisocyanate, diphenylmethane diisocyanate, polymethylene polyphenylene diisocyanate, tolidine diisocyanate and naphthalene diisocyanate. Examples of the commercially available polyisocyanates may include "CORONATE L" produced by Nippon Polyurethane Co., Ltd., or the like. The amount of the polyisocyanate used is usually about 0.8 to 1.5 times the hydroxyl equivalent of the polyester-based resin. When the amount of the polyisocyanate used is less than 0.8 time a hydroxyl equivalent of the polyester-based resin, the amount of the isocyanate groups tends to be insufficient, so that the resultant polyester-based resin layer (C) may fail to exhibit a sufficient crosslinking density, resulting in insufficient resistance to solvents contained in printing ink. On the other hand, when the amount of the polyisocyanate used is more than 1.5 times the hydroxyl equivalent of the polyester-based resin, the amount of the isocyanate groups tends to be excessive, so that the resultant polyester-based resin layer (C) tends to be too hard and deteriorated in flexibility.

Further, a silane coupling agent is preferably added to the polyester-based resin in order to enhance the adhesion to the inorganic thin film (B). The amount of the silane coupling agent used is usually 0.01 to 5% by weight, preferably 0.1 to 3% by weight. In addition, the polyester-based resin may also contain various known additives such as antistatic agents, light-shielding agents, ultraviolet absorbers, plasticizers, fillers, colorants, stabilizers, defoaming agents, crosslinking agents, anti-blocking agents and antioxidants.

The thickness of the polyester-based resin layer (C) is usually 0.05 to 5 μm, preferably 0.1 to 2 μm. When the thickness of the polyester-based resin layer (C) is less than 0.05 μm, the inorganic thin film (B) may not be prevented from being damaged upon printing. When the thickness of the polyester-based resin layer (C) is more than 5 μm, the transferring property of printing ink thereonto tends to be deteriorated.

The gas-barrier laminate of the present invention has an oxygen permeability of usually not more than 5 $cc/m^2/day/atm$, preferably not more than 3 $cc/m^2/day/atm$. The lower limit of the oxygen permeability of the gas-barrier laminate is usually not less than 0.01 $cc/m^2/day/atm$. The gas-barrier laminate has a water vapor permeability of usually not more than 5 $g/m^2/day$, preferably not more than 3 $g/m^2/day$. The lower limit of the water vapor permeability of the gas-barrier laminate is usually not less than 0.01 $g/m^2/day$.

In the gas-barrier laminate of the present invention, a printed layer may be laminated on the polyester-based resin layer (C), and further the other plastic substrate or a paper substrate may be laminated on the printed layer. As the printing ink for forming the printed layer, there may be used water-based or solvent-based resin-containing printing inks. Examples of the resins used in the printing inks may include acrylic resins, urethane-based resins, polyester-based resins, vinyl chloride-based resins, vinyl acetate copolymer resins, and mixtures thereof. In addition, the printing inks may contain various known additives such as antistatic agents, light-shielding agents, ultraviolet absorbers, plasticizers, slip agents, fillers, colorants, stabilizers, lubricants, defoaming agents, crosslinking agents, anti-blocking agents, antioxidants or the like.

The method of forming the printed layer is not particularly limited, and the printed layer may be produced by known printing methods such as offset printing method, gravure printing method and screen printing method. The drying of the printed layer for removing the solvent therefrom may also be conducted by known methods such as hot-air drying method, hot-roll drying method and infrared drying method.

When a heat sealable resin is used as a material of the other plastic substrate to be laminated on the printed layer, the resultant laminate can exhibit a heat-sealability and, therefore, may be used to produce various containers, especially retort containers. More specifically, such a laminate comprising plastic substrate (A)/inorganic thin film (B)/polyester-based resin layer (C)/printed layer/other heat-sealable plastic substrate (heat seal layer) (hereinafter referred to merely as "gas-barrier film") may be formed into a (retort) container having an excellent gas-barrier property by using the other heat-sealable plastic substrate as an inner layer thereof.

Further, at least one layer made of a paper or plastic film may be laminated between the printed layer and the heat seal layer. As the plastic film, there may be used films comprising the same plastic material as that of the plastic substrate (A). Among these materials, preferred are papers, polyester resins, polyamide resins and biodegradable resins from the standpoint of ensuring sufficient rigidity and strength of the resultant laminate.

Examples of the above heat-sealable resins may include known resins such as polyethylene resins, polypropylene resins, ethylene-vinyl acetate copolymer resins, ionomer resins, EAA resins, EMAA resins, EMA resins, EMMA resins, EEA resins and biodegradable resins. The heat seal layer may be laminated on the printed layer by dry lamination method using an adhesive or extrusion lamination method using an adhesive resin.

The gas-barrier film obtained by laminating the printed layer and the heat seal layer on the gas-barrier laminate of the present invention exhibits an oxygen permeability of usually not more than 3 $cc/m^2/day/atm$, preferably not more than 1 $cc/m^2/day/atm$. The lower limit of the oxygen permeability of the gas-barrier film is usually not less than 0.01 $cc/m^2/day/atm$. Meanwhile, the gas-barrier laminate of the present invention which comprises plastic substrate (A)/the inorganic thin film (B)/polyester-based resin layer (C) has an oxygen permeability of not more than 5 $cc/m^2/day/atm$ as described above. These gas-barrier laminates and the gas-barrier films having the above-specified oxygen permeability are classified into so-called high gas-barrier films. The gas-barrier laminates and the gas-barrier films according to the present invention are characterized in that the gas-barrier property thereof is less deteriorated even after subjected to hydrothermal treatments under pressure such as so-called retort treatments. In particular, when the gas-barrier laminate of the present invention is heat-treated, it is possible to efficiently impart the above properties thereto.

More specifically, after laminating the inorganic thin film (B) on the plastic substrate (A) and then heat-treating the obtained laminate, the polyester-based resin layer (C) is formed on the inorganic thin film (B) to produce the gas-barrier laminate of the present invention. Thereafter, a plastic film (preferably a polypropylene film) is laminated on the polyester-based resin layer to produce the gas-barrier film. When subjecting the resultant gas-barrier film to hydrothermal treatment under pressure at 120° C. for 30 min, the ratio in oxygen permeability of the film between before and after the hydrothermal treatment under pressure (ratio of the oxygen permeability after the hydrothermal treatment to that before the hydrothermal treatment) is usually not more than 5, preferably not more than 4. The lower limit of the oxygen permeability ratio is usually not less than 1. The oxygen permeability of the gas-barrier film after subjected to the hydrothermal treatment under pressure is usually not more than 7 $cc/m^2/day/atm$, preferably not more than 5 $cc/m^2/day/atm$, more preferably not more than 3 $cc/m^2/day/atm$.

Alternatively, after laminating the inorganic thin film (B) and the polyester-based resin layer (C) on the plastic substrate (A) to produce the gas-barrier laminate of the present invention, the plastic film is further laminated thereon and heat-treated to produce the gas-barrier film. When subjecting the resultant gas-barrier film to hydrothermal treatment under pressure at 120° C. for 30 min, the ratio in oxygen permeability of the film between before and after the hydrothermal treatment under pressure (ratio of the oxygen permeability after the hydrothermal treatment to that before the hydrothermal treatment) is usually not more than 5, preferably not more than 4. The lower limit of the oxygen permeability ratio of such a film is usually not less than 1. The oxygen permeability of the gas-barrier film after subjected to the hydrothermal treatment under pressure is usually not more than 7 cc/m$^2$/day/atm, preferably not more than 5 cc/m$^2$/day/atm, more preferably not more than 3 cc/m$^2$/day/atm.

The above heat treatment may be usually applied to the thus-formed gas-barrier film or gas-barrier laminate. As the method of subjecting the gas-barrier film to the heat treatment, there may be use either the method of subjecting a container, a bag, etc., which are fabricated from the gas-barrier film, to the heat treatment, or the method of subjecting the fabricated container or bag filled with contents to the heat treatment. Although optimum conditions of the heat treatment vary depending upon kind and thickness of the respective components constituting the gas-barrier film or gas-barrier laminate, any methods may be used without particular limitations as long as the time and temperature used therein can be maintained as required. For example, there may be used the method of preserving the film or laminate in an oven or constant-temperature chamber set to the temperature as required, the method of blowing a hot air to the film or laminate, the method of heating the film or laminate by an infrared heater, the method of irradiating the film or laminate with light from a lamp, the method of directly applying heat to the film or laminate by contacting with a heated roll or a heated plate, or the method of irradiating the film or laminate with a microwave. In this case, the gas-barrier film or gas-barrier laminate may be cut into a suitable size which is easy to handle, and then subjected to the heat treatment. Alternatively, the rolled film or laminate may be directly subjected to the heat treatment. In addition, as long as the required time and temperature are ensured, a suitable heating device may be incorporated into a part of a film-forming apparatus such as a coater and a slitter to conduct the heat treatment during the production process of the gas-barrier film or gas-barrier laminate.

The temperature used in the above heat treatment is not particularly limited as long as the temperature lies within the range of usually from 60° C. to the melting point of the plastic substrate (A) or the plastic film used. The lower limit of the heat-treating temperature is preferably 70° C., whereas the upper limit of the heat-treating temperature is usually 200° C., preferably 160° C. When the heat-treating temperature is less than 60° C., the time required until exhibiting the effects of the heat treatment is extremely prolonged, resulting in unpractical process. The heat-treating time tends to be shortened as the heat-treating temperature is raised. Further, when the heat-treating temperature is too high, the gas-barrier film or the gas-barrier laminate tends to be deteriorated in gas-barrier property due to heat decomposition of components thereof. Therefore, the heat-treating time is preferably shortened. Consequently, the preferable heat treatment conditions include, for example, from about 3 days to about 6 months at 60° C., from about 3 hours to about 10 days at 80° C., from about one hour to about one day at 120° C. and from about 3 to 60 min at 150° C., although the above-specified conditions are merely illustrative and, therefore, may vary depending upon kind and thickness of the components constituting the gas-barrier film or the gas-barrier laminate.

In the gas-barrier laminate and the gas-barrier film of the present invention, the adhesion strength between the plastic substrate (A) and the inorganic thin film (B) as measured after subjecting the laminate or film to the hydrothermal treatment under pressure at 120° C. for 30 min, is usually not less than 100 g/15 mm, preferably not less than 200 g/15 mm notwithstanding whether the laminate or film is heat-treated or not. Meanwhile, when subjecting the laminate or film to no heat treatment, the anchor coat layer is preferably provided between the plastic substrate (A) and the inorganic thin film (B) to achieve the same adhesion strength therebetween as that of the heat-treated laminate or film. Further, in the case of the laminate or film obtained by forming the printed layer and the heat seal layer on the gas-barrier laminate of the present invention, the adhesion strength between the printed layer and the polyester-based resin layer (C) as measured after subjecting the laminate or film to the hydrothermal treatment under pressure at 120° C. for 30 min, is usually not less than 100 g/15 mm, preferably not less than 200 g/15 mm. Also, the change in shrinkage percentage of the gas-barrier laminate or the gas-barrier film of the present invention between before and after subjecting the laminate or film to the hydrothermal treatment under pressure is usually not more than 3%, preferably not more than 2%.

EXAMPLES

The present invention is described in more detail by the following examples, but these examples are only illustrative and not intended to limit the scope of the present invention. Meanwhile, in the following Examples and Comparative Examples, various properties were measured by the following methods.

(1) Oxygen Permeability (cc/m$^2$/day/atm):

The oxygen permeability was measured at a temperature of 25° C. and a relative humidity of 80% using an oxygen permeability measuring apparatus "OX-TRAN100" manufactured by Modern Control Corp., according to ASTM-D3985.

(2) Water Vapor Permeability (g/m$^2$/day):

The water vapor permeability was measured at a temperature of 40° C. and a relative humidity of 90% using an water vapor permeability measuring apparatus "Permatran-W1" manufactured by Modern Control Corp., according to ASTM-F1249.

(3) Adhesion Strength:

As a sample film, there was used a laminate comprising plastic substrate/surface-modifying layer/silicon oxide thin film/polyester resin coating layer/printed layer/adhesive layer/polypropylene film as the other plastic film which laminate was in the form of a strip-like film having a width of 15 mm and a length of 100 mm and in which a spacer made of a release paper was disposed in place of a part of the adhesive layer on its half (½)-length portion (i.e., a portion having a width of 15 mm and a length of 50 mm) for forming an adhesive layer-free region therein. The thus formed laminate was subjected to T-peel test in which an (A) side of the laminate comprising plastic substrate/surface-modifying layer/silicon oxide thin film/polyester resin coating layer/printed layer and a (B) side thereof comprising the polypropylene film as the other plastic film was respectively peeled off from the side of the adhesive layer-free region. More specifically, respective end portions of the A and B sides of the sample film were clamped with a stationary gripper and a movable gripper of an autograph "DSS-100" (testing apparatus according to JIS K 7127) manufactured by Shimadzu Seisakusho Co., Ltd., at 23° C. and 50% RH, and the sample film was fitted to the testing apparatus such that a distance between the respective grippers was 60 mm. Then, the movable gripper was moved by 30 mm at a pulling velocity of 300 mm/min to measure and record a tensile load applied using a strain gauge and obtain a center line value thereof from the thus prepared characteristic curve of tensile load. Three sample films were tested to determined an average thereof.

(4) Gradation Printability:

Using a printing ink "NT HiLAMIC" produced by Dainichi Seika Co., Ltd., and a printer "FE-185" manufactured by Fuji Kikai Kogyo Co., Ltd., printing patterns (half-tone dots) composed of black, indigo blue, red, yellow and white colors were formed on the polyester-based resin layer of the sample film at a printing speed of 100 m/min to examine a reproducibility of concentrations of half-tone dots in the printing patterns from which the gradation printability was evaluated. Evaluation ratings are shown in Table 1 below.

TABLE 1

| | |
|---|---|
| A: | Degree of spread of the half-tone dots was identical to the case where no polyester-based resin layer was formed. |
| B: | Degree of spread of the half-tone dots was smaller than the case where no polyester-based resin layer was formed, but still kept large. |
| C: | Degree of spread of the half-tone dots was small, and apparent concentration was considerably lowered. |
| D: | No spread of the half-tone dots was observed. |

(5) Anti-Blocking Property:

A gas-barrier laminate provided with a polyester resin coating layer was taken up by 800 mm in width and 4000 m in length into a roll having a hardness of 92° as measured by a rubber hardness meter. The roll was preserved at 50° C. for one month, and then unwound through a slitter to evaluate an anti-blocking property thereof. Evaluation ratings are shown in Table 2 below.

TABLE 2

| | |
|---|---|
| A: | Neither peel sound nor electrification due to peel were caused. |
| B: | No peel sound but slight electrification due to peel were caused. |
| C: | Slight peel sound and some electrification due to peel were caused. |
| D: | Peel sound and severe electrification due to peel were caused. |

<Production of Aqueous Acrylic Resin>

A mixture of 40 parts by weight of ethyl acrylate, 30 parts by weight of methyl methacrylate, 20 parts by weight of methacrylic acid and 10 parts by weight of glycidyl methacrylate was subjected to solution polymerization in ethyl alcohol. After completion of the polymerization, the reaction solution was heated while adding water thereto to remove ethyl alcohol therefrom. The pH value of the reaction solution was adjusted to 7.5 by adding aqueous ammonia thereto, thereby obtaining an aqueous paint containing an aqueous acrylic resin.

<Production of Aqueous Polyurethane Resin>

First, a polyester polyol was produced from 664 parts of terephthalic acid, 631 parts of isophthalic acid, 472 parts of 1,4-butanediol and 447 parts of neopentyl glycol. Next, the thus obtained polyester polyol was mixed with 321 parts of adipic acid and 268 parts of dimethylolpropionic acid, thereby obtaining a pendant carboxyl group-containing polyester polyol A. Further, 1880 parts of the thus obtained polyester polyol A was mixed with 160 parts of hexamethylene diisocyanate, thereby obtaining an aqueous paint containing an aqueous polyurethane-based resin.

Example 1

Polyethylene terephthalate (hereinafter referred to merely as "PET") "NOVAPEX" (IV: 0.65) produced by Mitsubishi Chemical Corporation was melt-extruded into a sheet by an ordinary method. The resultant sheet was longitudinally stretched at 95° C. and a stretch ratio of 3.3, and then an aqueous coating solution (resin content: 5%) comprising a mixed resin containing 60% by weight of an oxazoline group-containing polymer "EPOCROSS WS-500" produced by Nippon Shokubai Co., Ltd., 20% by weight of an aqueous acrylic resin and 20% by weight of an aqueous polyurethane resin was applied onto the stretched sheet by an in-line coating method. The resultant stretched sheet was further transversely stretched at 110° C. and a stretch ratio of 3.3, thereby obtaining a biaxially stretched PET film. The thus obtained biaxially stretched PET film had a total film thickness of 12 μm, and was provided thereon with a 0.1 μm-thick surface-modifying layer made of the above mixed resin. Next, silicon oxide (SiO) was vapor-deposited on the surface-modifying layer by a high-frequency heating method using a vacuum deposition apparatus to form a silicon oxide thin film as a vapor-deposited layer ($SiO_x$) having a thickness of about 10 nm. As a result, it was confirmed that the thus obtained PET film provided thereon with the silicon oxide thin film had an oxygen permeability of 2.3 $cc/m^2 \cdot 24$ h·atm, and a water vapor permeability of 5.4 $g/m^2 \cdot 24$ h.

Next, 20 parts by weight of a polyester resin having a glass transition temperature of 55° C., a molecular weight of 8000 and a hydroxyl value of 15 mg and containing terephthalic acid, isophthalic acid, ethylene glycol and neopentyl glycol as main constitutional units, and 2 parts by weight of stearamide were dissolved in a mixed solvent comprising 39 parts by weight of toluene and 39 parts by weight of methyl ethyl ketone, and further the resultant solution was mixed with a polyisocyanate "CORONATE L" produced by Nippon Polyurethane Co., Ltd., in an amount 1.2 times a hydroxyl equivalent of the polyester resin, thereby producing a coating material. The thus obtained coating material was applied onto the surface of the silicon oxide thin film formed on the PET film, and then dried at 100° C. for 60 sec to form a 0.5 μm-thick coating film, thereby obtaining a gas-barrier laminate. The resultant gas-barrier laminate was tested to evaluate an anti-blocking property and an oxygen permeability thereof. As a result, it was confirmed that the gas-barrier laminate exhibited an oxygen permeability of 1.2 $cc/m^2 \cdot 24$ h·atm, and a water vapor permeability of 1.4 $g/m^2 \cdot 24$ h.

The obtained gas-barrier laminate was printed to evaluate a gradation printability thereof. Further, an urethane-based adhesive (mixture containing adhesives "AD-900" and "CAT-RT85" both produced by Toyo Morton Co., Ltd., at a blending ratio of 10:1.5) was applied onto the surface of a printed layer formed on the gas-barrier laminate whose gradation printability was evaluated above, and then dried, thereby forming an adhesive resin layer having a thickness of 4 μm. Onto the thus obtained adhesive resin layer was laminated a 50 μm-thick unstretched polypropylene film "TOREFAN NO ZK-93K" produced by Toray Synthetic Film Co., Ltd., thereby obtaining a gas-barrier film having such a layer structure comprising PET film/surface-modifying layer/silicon oxide thin film/polyester resin coating layer/printed layer/adhesive resin layer/polypropylene film. The thus obtained gas-barrier film was aged at 40° C. for 3 days. Then, the resultant gas-barrier film was tested to evaluate an oxygen permeability thereof as well as adhesion strength between the layers thereof. As a result, it was confirmed that the gas-barrier film had an ink adhesion strength of 320 g/15 mm.

Next, the gas-barrier film was subjected to hydrothermal treatment under pressure in an autoclave at 120° C. for 30 min to measure an oxygen permeability and an adhesion strength thereof before and after the hydrothermal treatment, and compare the measured values with each other. The results are shown in Table 3.

Example 2

The same procedure as defined in Example 1 was conducted except that the polyester resin used for forming the polyester resin coating layer was changed to a polyester resin having a glass transition temperature of 63° C., a molecular weight of 2000 and a hydroxyl value of 60 mg, and comprising terephthalic acid, isophthalic acid, ethylene glycol and neopentyl glycol as main constitutional units, thereby obtaining a gas-barrier laminate and a gas-barrier film and evaluating properties thereof. The results are shown in Table 3.

Example 3

The same procedure as defined in Example 1 was conducted except that the polyisocyanate was added in an amount 0.8 time a hydroxyl equivalent of the polyester resin, thereby obtaining a gas-barrier laminate and a gas-barrier film and evaluating properties thereof. The results are shown in Table 3.

Example 4

The same procedure as defined in Example 1 was conducted except that 0.5 parts by weight of silica particles "SEAHOSTER" (average particle size: 0.5 μm) produced by Nippon Shokubai Co., Ltd., and 1 part by weight of a silane coupling agent "SH6040" produced by Toray Dow Corning Silicone Co., Ltd., were added to the polyester resin coating material, thereby obtaining a gas-barrier laminate and a gas-barrier film and evaluating properties thereof. The results are shown in Table 3.

Comparative Example 1

The same procedure as defined in Example 1 was conducted except that no polyester resin coating material was applied, thereby obtaining a gas-barrier laminate and a gas-barrier film and evaluating properties thereof. The results are shown in Table 3.

Comparative Example 2

The same procedure as defined in Example 1 was conducted except that the polyester resin used for forming the polyester resin coating layer was changed to a polyester resin having a glass transition temperature of 65° C., a molecular weight of 18000 and a hydroxyl value of 4 mg, and comprising terephthalic acid, isophthalic acid, ethylene glycol and neopentyl glycol as main constitutional units, and no polyisocyanate was added, thereby obtaining a gas-barrier laminate and a gas-barrier film and evaluating properties thereof. The results are shown in Table 3.

Comparative Example 3

The same procedure as defined in Example 1 was conducted except that the polyester resin used for forming the polyester resin coating layer was changed to a polyester resin having a glass transition temperature of 65° C., a molecular weight of 18000 and a hydroxyl value of 4 mg, and comprising terephthalic acid, isophthalic acid, ethylene glycol and neopentyl glycol as main constitutional units, thereby obtaining a gas-barrier laminate and a gas-barrier film and evaluating properties thereof. The results are shown in Table 3.

Comparative Example 4

The same procedure as defined in Example 1 was conducted except that the polyester resin used for forming the polyester resin coating layer was changed to a polyester resin having a glass transition temperature of 77° C., a molecular weight of 20000 and a hydroxyl value of 7 mg, and comprising terephthalic acid, isophthalic acid, ethylene glycol, neopentyl glycol and bisphenol A as main constitutional units, thereby obtaining a gas-barrier laminate and a gas-barrier film and evaluating properties thereof. The results are shown in Table 3.

Comparative Example 5

The same procedure as defined in Example 1 was conducted except that the polyester resin used for forming the polyester resin coating layer was changed to a polyester resin having a glass transition temperature of 65° C., a molecular weight of 1000 and a hydroxyl value of 100 mg, and comprising terephthalic acid, isophthalic acid, ethylene glycol and neopentyl glycol as main constitutional units, thereby obtaining a gas-barrier laminate and a gas-barrier film and evaluating properties thereof. The results are shown in Table 3.

Comparative Example 6

The same procedure as defined in Example 1 was conducted except that the polyester resin used for forming the polyester resin coating layer was changed to a polyester resin having a glass transition temperature of 45° C., a molecular weight of 10000 and a hydroxyl value of 20 mg, and comprising terephthalic acid, isophthalic acid, adipic acid, ethylene glycol and pentyl glycol as main constitutional units, thereby obtaining a gas-barrier laminate and a gas-barrier film and evaluating properties thereof. The results are shown in Table 3.

Reference Example 1

The same procedure as defined in Example 1 was conducted except that no stearamide was added to the polyester resin coating material, thereby obtaining a gas-barrier laminate and a gas-barrier film and evaluating properties thereof. The results are shown in Table 3.

TABLE 3

| | Oxygen permeability ($cc/m^2 \cdot 24\,h \cdot atm$) | | Adhesion strength (g/15 mm) | |
|---|---|---|---|---|
| | Before hydrothermal treatment | After hydrothermal treatment | Before hydrothermal treatment | After hydrothermal treatment |
| Example 1 | 1.3 | 1.5 | 380 | 150 |
| Example 2 | 1.8 | 2.3 | 430 | 180 |
| Example 3 | 1.3 | 1.4 | 480 | 200 |
| Example 4 | 1.1 | 1.3 | 400 | 320 |
| Comparative Example 1 | 10.5 | 27.3 | 120 | 50 |
| Comparative Example 2 | 1.5 | 2.8 | 300 | 80 |
| Comparative Example 3 | 2.3 | 3.2 | 380 | 150 |

TABLE 3-continued

|  |  |  |  |  |
|---|---|---|---|---|
| Comparative Example 4 | 2.6 | 5.1 | 180 | 90 |
| Comparative Example 5 | 3.5 | 7.2 | 430 | 180 |
| Comparative Example 6 | 1.8 | 3.4 | 400 | 90 |
| Reference Example 1 | 2.3 | 5.2 | 380 | 180 |

|  | Transferring property | Anti-blocking property |
|---|---|---|
| Example 1 | B | A |
| Example 2 | A | A |
| Example 3 | B | B |
| Example 4 | B | A |
| Comparative Example 1 | A | A |
| Comparative Example 2 | D | C |
| Comparative Example 3 | C | B |
| Comparative Example 4 | B | B |
| Comparative Example 5 | A | B |
| Comparative Example 6 | B | D |
| Reference Example 1 | B | D |

The invention claimed is:

1. A printable gas-barrier laminate consisting of
a plastic substrate (A),
an inorganic film (B) having a thickness of 0.5 to 40 nm formed on at least one surface of the plastic substrate (A), and
a polyester-based resin layer (C) having a thickness of 0.5 to 5 μm formed by applying on a surface of the inorganic film (B) a coating material containing a polyester-based resin, a fatty amide in an amount of 0.1 to 20 parts by weight based on 100 parts by weight of the polyester-based resin and a polyisocyanate as a curing agent in which a content of the polyisocyanate in the coating material is 0.8 to 1.5 times a hydroxyl equivalent of the polyester-based resin,
said polyester-based resin having a glass transition temperature of 50 to 70° C., a weight average molecular weight of 1500 to 8000 and a hydroxyl value of 10 to 60 mg KOH/g, and
said gas-barrier laminate having an oxygen permeability of not more than 5 cc/m²/day/atm and a water vapor permeability of not more than 5 g/m²/day.

2. A printable gas-barrier laminate according to claim 1, wherein the plastic substrate (A) comprises a polyester resin, a nylon resin, a polyolefin resin or a biodegradable resin.

3. A printable gas-barrier laminate according to claim 1, wherein the inorganic thin film (B) is a physically vapor-deposited film or a chemically vapor-deposited film comprising silicon oxide, aluminum oxide, diamond-like carbon or a mixture thereof.

4. A printable gas-barrier laminate according to claim 1, wherein when the laminate is subjected to hydrothermal treatment under pressure at 120° C. for 30 min, a ratio of an oxygen permeability of the laminate before the hydrothermal treatment to that after the hydrothermal treatment is not more than 5.

5. A printable gas-barrier laminate consisting of
a plastic substrate (A),
an inorganic film (B) having a thickness of 0.5 to 40 nm formed on at least one surface of the plastic substrate (A),
a polyester-based resin layer (C) having a thickness of 0.5 to 5 μm formed by applying on a surface of the inorganic film (B) a coating material containing a polyester-based resin on a surface of the inorganic film (B), a fatty amide in an amount of 0.1 to 20 parts by weight based on 100 parts by weight of the polyester-based resin and a polyisocyanate as a curing agent in which a content of the polyisocyanate in the coating material is 0.8 to 1.5 times a hydroxyl equivalent of the polyester-based resin, and
an anchor coat layer disposed between the plastic substrate (A) and the inorganic thin film (B) wherein said polyester-based resin having a glass transition temperature of 50 to 70° C., a weight average molecular weight of 1500 to 8000 and a hydroxyl value of 10 to 60 mg KOH/g, and
said gas-barrier laminate having an oxygen permeability of not more than 5 cc/m²/day/atm and a water vapor permeability of not more than 5 g/m²/day.

6. A printable gas-barrier laminate according to claim 5, wherein the anchor coat layer comprises at least one material selected from the group consisting of a polyester-based resin, an urethane resin, an acrylic resin and an oxazoline group-containing resin.

7. A printable gas-barrier laminate according to claim 5, wherein after forming the inorganic film (B) on the plastic substrate (A) or on an anchor coat layer formed on the plastic substrate (A) between the inorganic film (B) and the plastic substrate (A), the resultant laminate is heat-treated at a temperature of not less than 60° C., and then the coating material containing the polyester-based resin is applied onto the inorganic thin film (B) to form the polyester-based resin layer (C) thereon.

8. A printable gas-barrier laminate according to claim 5, wherein when the laminate is subjected to hydrothermal treatment under pressure at 120° C. for 30 min, a ratio of an oxygen permeability of the laminate before the hydrothermal treatment to that after the hydrothermal treatment is not more than 5.

9. A printable gas-barrier laminate according to claim 5, wherein when the laminate is subjected to hydrothermal treatment under pressure at 120° C. for 30 min, an adhesion strength between the plastic substrate (A) or the anchor coat layer formed on the plastic substrate (A) and the inorganic film (B) is not less than 100 g/15 mm.

* * * * *